(12) United States Patent
Takamine et al.

(10) Patent No.: US 7,221,470 B2
(45) Date of Patent: May 22, 2007

(54) IMAGE OUTPUT DEVICE, IMAGE FORMING DEVICE AND METHOD FOR GENERATING VIDEO HARD COPY

(75) Inventors: Kouichi Takamine, Kawanishi (JP); Atsushi Hirose, Sanda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 806 days.

(21) Appl. No.: 10/309,069

(22) Filed: Dec. 4, 2002

(65) Prior Publication Data

US 2003/0107773 A1 Jun. 12, 2003

(30) Foreign Application Priority Data

Dec. 12, 2001 (JP) ............................. 2001-379335

(51) Int. Cl.
*G06F 15/00* (2006.01)
(52) U.S. Cl. .................... 358/1.15; 358/1.17; 358/1.18; 358/1.13; 358/1.14; 715/839; 382/305
(58) Field of Classification Search ............... 358/1.17, 358/1.18, 1.13–1.15; 345/329, 356; 382/305; 348/572

See application file for complete search history.

(56) References Cited

U.S. PATENT DOCUMENTS

| | | | |
|---|---|---|---|
| 4,703,366 A | | 10/1987 | Kobori et al. |
| 5,764,868 A | | 6/1998 | Yum et al. |
| 5,793,366 A | * | 8/1998 | Mano et al. ................ 715/839 |
| 6,674,538 B2 | * | 1/2004 | Takahashi .................. 358/1.15 |
| 2002/0135808 A1 | * | 9/2002 | Parry ........................ 358/1.17 |

FOREIGN PATENT DOCUMENTS

| | | |
|---|---|---|
| EP | 0 892 543 | 1/1999 |
| EP | 1 079 595 | 2/2001 |
| JP | 2001-54060 | 2/2001 |
| JP | 2001-218139 | 8/2001 |
| JP | 2001-218140 | 8/2001 |

\* cited by examiner

*Primary Examiner*—Twyler M. Lamb
*Assistant Examiner*—Robert N. Kang
(74) *Attorney, Agent, or Firm*—Wenderoth, Lind & Ponack, L.L.P.

(57) ABSTRACT

A video buffer that updates and holds an inputted video signal by a unit of a frame image includes: an image data holding unit having a first image data holding unit that holds the latest frame image, a second image data holding unit that holds a second frame image that goes back n pieces of frames in time from the first frame image and a third image data holding unit that holds the third frame image that goes back m pieces of frames in time from the first frame image; a moving picture display unit that displays the latest frame image held in the first image data holding unit; a print data selection unit that selects a frame image stored in any of the first to third image data holding units as a print object; a print confirmation display unit that displays the selected frame image; a print data generation unit that converts the image data of the displayed image into print data and so forth.

28 Claims, 12 Drawing Sheets

(14~24: Frame image number)

IMAGE OUTPUT DEVICE, IMAGE FORMING DEVICE AND METHOD FOR GENERATING VIDEO HARD COPY

BACKGROUND OF THE INVENTION (1) Field of the Invention

The present invention relates to an image output device, an image forming device and method for generating a video hard copy to print a video (moving images) displayed on a monitor screen and especially to technology that identifies suitably one image to be printed.

(2) Description of the Prior Art

Conventionally, as for a method for producing a hard copy of a video (moving images) displayed on a monitor screen of a television receiver, there is a method for using an analogue video printer.

This analogue video printer is connected with a television receiver and is provided with the same signal as an analogue video signal provided to a monitor screen of the television receiver. This analogue video signal is digitized in the analogue video printer and is recorded as image data in frame memory in the analogue video printer in sequence similarly to an image displayed in the monitor screen in a unit of frame.

In this case, when the analogue video printer receives an instruction from a user to print an image, an update of the image data by the frame memory of the analogue video printer is stopped and the image data of the image to be printed is decided. This decided image data are read out from the frame memory and are converted to printing data.

Furthermore, the analogue video printer executes print processing based on this printing data. As is described above, conventionally, one image displayed on the monitor screen of the television receiver is identified and this image is printed.

However, conventionally, in the case that the user gives a print instruction while he is watching the monitor screen of a television receiver, from the time the user captures the image by vision that he wants to print to the time he instructs to print, response delay time occurs generally, and therefore, an image later than the image he wants to print is printed and it is very irksome.

Additionally, from the time the analogue video printer starts the print processing to the time it finishes the printing processing, it takes, generally, several seconds to several tens of seconds. During this time, the video displayed on the monitor screen of the television receiver is ever changing. For this reason, it is impossible to select an image to be printed and to confirm its advisability using the monitor screen of the television receiver. When the user tries to select an image to be printed and to confirm its advisability, until the work is done, the video broadcast in real time is discontinued.

As is described above, in the case of printing using the conventional analogue video printer, since the image that the user does not want is printed and the video (the moving images) is discontinued, it is difficult to use.

SUMMARY OF THE INVENTION

In view of the foregoing, it is an object of this invention to provide an image output device and so forth that by which a user can select the image that he wants to print with reliability in the case of producing a hard copy of a video (a moving picture) of television broadcast and so forth displayed on a monitor screen. Further, it is also an object of this invention to provide the image output device and so forth that can display the video (the moving picture) that is broadcast in real time continuously without interruption while an image is being printed.

To achieve the above-mentioned objects, the image output device according to the present invention is an image output device that outputs an image that inputted moving image signal indicates to a printing device comprising: a frame image holding unit operable to hold at least two frame images that are n pieces of frame images apart in time among a series of moving images by updating and holding the inputted moving image by a unit of a frame image displayed on a screen; a display unit operable to display the frame images held by the frame image holding unit; a selection unit operable to select one frame image among the frame images held by the frame image holding unit according to an instruction by an operator concerning the frame image displayed on the display unit; and an output unit operable to output the selected frame image to the printing device.

As a result, since the present device holds at least two frame images that are n frames apart and displays these frame images that are held, the user can select the image that is closer to the timing he wants, considering n frames' time from confirming the image he wants to print to executing a print instruction.

Additionally, to achieve the above-mentioned objects, the image output device according to the present invention is an image output device that outputs an image that inputted moving image signal indicates to a printing device comprising: a frame image holding unit operable to hold at least a latest first frame image and a second frame image that goes back n pieces of frame images in time from the latest first frame image by updating and holding the inputted moving image by a unit of a frame image displayed on a screen; a display unit operable to display the frame images held by the frame image holding unit; a selection unit operable to select one frame image among the frame images held by the frame image holding unit according to an instruction by an operator concerning the frame image displayed on the display unit; and an output unit operable to output the selected frame image to the printing device.

As a result, since the present device updates and holds at least the latest frame image and two frame images that are n frames apart form the latest frame image and displays these frame images that are held, the user can select a image that goes back n frames in time from the latest image at the time he executes a print instruction.

Furthermore, to achieve the above-mentioned objects, the image output device according to the present invention is an image output device that outputs an image that inputted moving image signal indicates to a printing device comprising: a frame image holding unit operable to hold a first frame image, a second frame image that goes back n pieces of frames in time from the first frame image and a third frame image that goes back m pieces of frames in time from the first frame image by updating and holding the inputted moving image by a unit of a frame image displayed on a screen; a display unit operable to display the frame images held by the frame image holding unit; a selection unit operable to select one frame image among the frame images held by the frame image holding unit according to an instruction by an operator concerning the frame image displayed on the display unit; and an output unit operable to output the selected frame image to the printing device.

As a result, since the present device updates and holds the first frame image, the frame images that are n frames and m frames apart from the first image, respectively, and displays these frame images that are held, the user can select the image that he wants more to print between the images that are n frames and m frames apart from the image at the time when he executes a print instruction.

Moreover, to achieve the above-mentioned objects, the display unit of the image output device according to the present invention includes a first display unit to display the first frame image held by the frame image holding unit and a second display unit to display at least one frame image out of all frame images held by the frame image holding unit in parallel with displaying by the first display unit.

As a result, the present device displays the first frame image, the frame images that are n frames and m frames apart from the first frame image, respectively, that are updated and held, the user can see the real time images without interruption and, at the same time, can select the image he wants more to print between the images that are n frames and m frames apart from the latest frame images.

Furthermore, to achieve the above-mentioned objects, the image output device according to the present invention further comprising a change unit to change the n or the m according to an instruction from the operator, wherein the selection unit selects one frame image based on the changed n or the changed m.

As a result, since the present device enables the user to change the values of n and m that are print timing coefficients, he can set more suitably a selection timing of the image that he wants to print by changing the values of n and m as necessary.

Additionally, to achieve the above-mentioned objects, the image output device according to the present invention further comprising a video presentation unit operable to present predetermined video that includes plural frame images whose frame numbers are individually distinguishable, wherein the change unit acquires a trial print instruction from the operator to the video presentation unit and changes the n or the m based on a frame image identified by the print instruction.

As a result, since the present device presents to the user the video that can distinguish each frame image in advance to the initial values of the print timing coefficients, n and m, and changes the values of n and m more suitably using this video, it is not necessary for the user to repeat modifications to determine the appropriate values of n and m.

Further, to achieve the above-mentioned objects, the image output device according to the present invention can be constructed to switch and display two images that are selection objects identified to be printed and to display plural images that are selection objects in thumbnail images. It is also possible that the present invention can be constructed to edit and process the images selected to be printed.

Furthermore, to achieve the above-mentioned objects, the present invention can be realized as an image forming device that includes part of the characteristic components of the image output device.

Moreover, to achieve the above-mentioned objects, the present invention can be realized as a video hard copy generation unit with the characteristic components of the image output device as steps or can be realized as a program that includes all the steps. The program can not only be stored in the built-in ROM in the device and so forth but also be distributed through recording medium like CD-ROM and so forth and transmission medium like communication network and so forth.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

The embodiments according to the present invention will be explained below with reference to the figures.

The First Embodiment

A video output device 10 according to the present embodiment captures image data of a video displayed on a television (hereafter, referred to as "TV") receiver and so forth and produces a hard copy based on the image data. Moreover, hereafter, "video" means moving images displayed on a monitor screen by TV broadcast, computer graphics and so forth.

Figure 1:
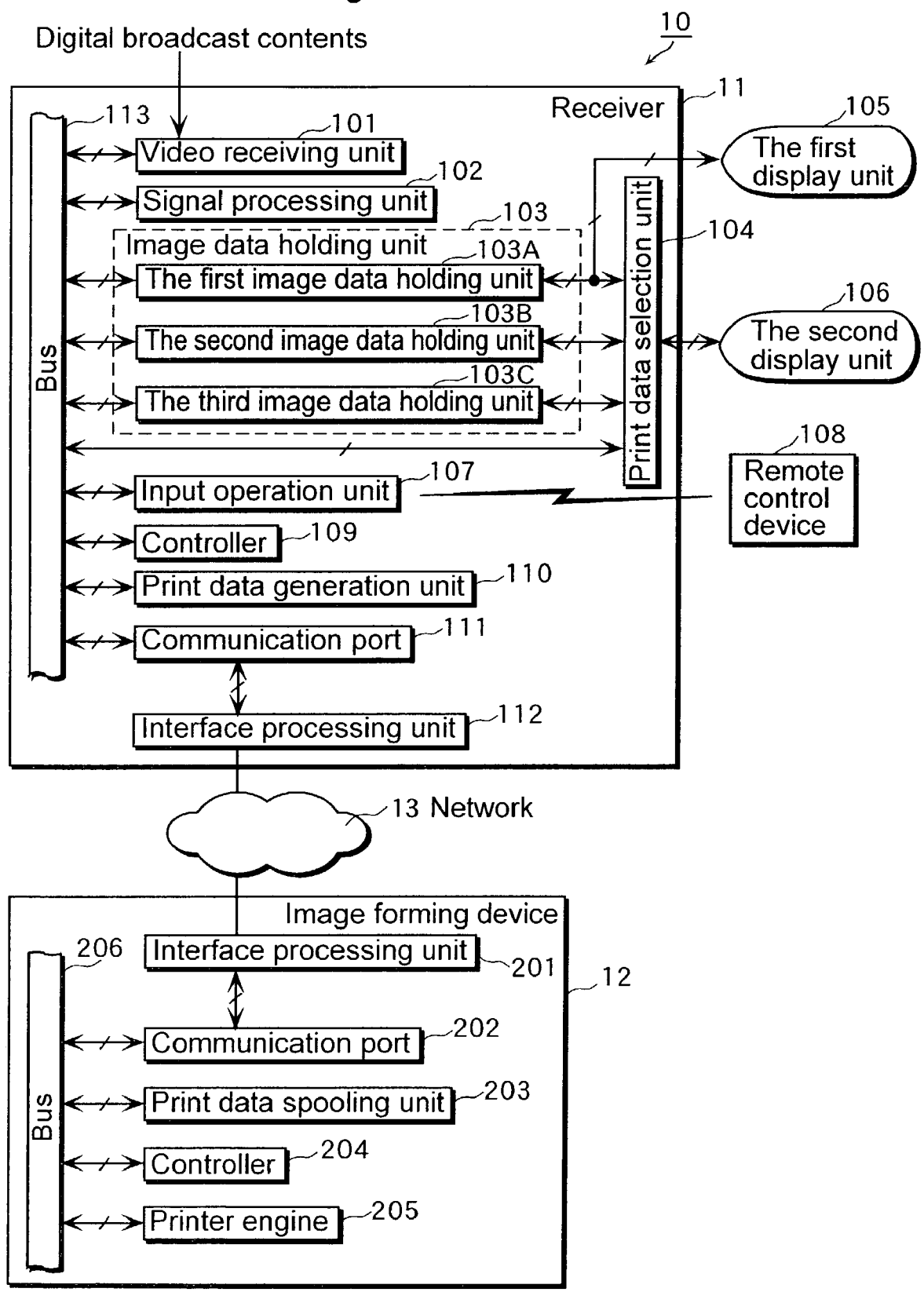
FIG. 1 is a block diagram that shows functional structures of a receiver and an image forming device according to the first embodiment.

FIG. 1 is a block diagram that shows functional structures of a receiver 11 and an image forming device 12 that constitute the image output device 10.

The receiver 11 is a device that receives TV broadcast waves and so forth transmitted by terrestrial broadcasting, BS (Broadcasting Satellite), CS (Communication Satellite) and so forth, and comprises a video reception unit 101, a signal processing unit 102, an image data holding unit 103, a print data selection unit 104, a first display unit 105, a second display unit 106, an input operation unit 107, a remote control device 108, a controller 109, a print data generation unit 110, a communication port 111 and an interface processing unit 112. Moreover, the parts of the receiver 11 are connected to each other by a bus 113, a special-purpose cable and so forth.

The video reception unit 101 receives and decodes TV broadcast waves and so forth and extracts a video synchronous signal and, at the same time, transmits a hybrid signal that includes decoded moving images and text information (for example, a multiplex signal by MPEG system) to the signal processing unit 102 through the bus 113.

The signal processing unit 102, based on the hybrid signal received from the video reception unit 101, generates image data in a frame unit (hereafter, referred to simply as "image data") to be displayed on the first display unit 105 and the second display unit 106 and transmits the image data to the image data holding unit 103 through the bus 113.

The image data holding unit 103 is a memory device that holds the image data temporarily such as frame memory and so forth in order to have a video displayed in real time or to have a user (or an operator) select the image that he wants to print with reliability. To be more specific, the image data holding unit 103 captures the image data generated by the signal processing unit 102 in a frame cycle and holds the image data temporarily and in sequence.

Furthermore, the image data holding unit 103 comprises plural memorizing devices in order to hold plural image data. For example, the image holding unit 103 comprises the first image data holding unit 103A that holds the latest image data in order to display a TV video and so forth in real time, the second image data holding unit 103B and the third image data holding unit 103C that hold frame images alternately for a certain time (for example, 0.5 second) and update the frame images in sequence in order to produce a hard copy. In this case, the timing by which the second image data holding unit 103B and the third image data holding unit 103C hold and update the image data is determined by the controller 109.

Furthermore, the first image data holding unit 103A memorizes image data of a test video which will be explained later.

Moreover, the first image data holding unit 103A is connected with the first display unit 105 and the print data selection unit 104 while the second image data holding unit 103B and the third image data holding unit 103C are connected with the print data selection unit 104.

The print data selection unit 104 receives the image data held temporarily by the second image data holding unit 103B and the third image data holding unit 103C. Furthermore, the print data selection unit 104 outputs the image data of the images identified by an instruction of the controller 109 (for example, two images identified based on n and m) to the second display unit 106 and outputs the image data of the image selected by a user and received through the remote control device 108 and the input operation unit 107 to the bus 113.

The controller 109 is, for example, a CPU (Central Processing Unit) and controls the whole receiver 11 based on control program stored in a built-in ROM. To be more specific, the controller 109 controls switch of channels and display mode and so forth in the receiver 11 following the user's instruction received through the remote control device 108, the input operation unit 107 and the bus 113. Further, the controller 109 controls, based on a built-in calendar clock and the video synchronous signal extracted by the video reception unit 101, the timing by which the controller 109 holds the image data in the image data holding unit 103, the timing by which the controller 109 selects the image data in the print data selection unit 104 and the timing by which the controller 109 outputs the selected image data to the bus 113. Furthermore, the controller 109 transmits print data generated by the print data generation unit 110 to the image forming device 12 through the communication port 111 and the interface processing unit 112.

The print data generation unit 110 captures the image data selected as a print object by the print data selection unit 104 following the timing determined by the controller 109, and generates print data from this image data.

The communication port 111 is connected with network 13 such as Wide Area Network (hereafter, referred to as "WAN") and Local Area Network (hereafter, referred to as "LAN"), and exchanges data with external devices (for example, the image forming device 12 and a color printing device with a communication function) that are connected with the network 13.

The interface processing unit 112 converts the form of the print data received through the controller 109 into a form that can be transmitted on the network 13. For example, the print data are packetized conforming to the MPEG system.

The image forming device 12 is a device that receives the print data from the receiver 11, an external device, through the network 13 and so forth, executes printing based on the print data, and comprises an interface processing unit 201, a communication port 202, a print data spooling unit 203, a controller 204 and a printer engine 205. Moreover, the components comprising the image forming device 12 are connected to each other through the bus 206.

The interface processing unit 201 takes out the print data from data received through the network 13 (for example, packetized data conforming to the MPEG system), and outputs the print data to the communication port 202.

The communication port 202, similarly to the communication port 111, can be connected to the network 13 through the interface processing unit 201 and has a function to communicate with external devices.

The print data spooling unit 203, by an instruction of the controller 204, spools the unfolded print data and transmits the spooled print data to the printer engine 205. Moreover, the print data spooling unit 203 controls to execute print processing without delay by using a high-speed auxiliary storage (not illustrated) as a buffer.

The controller 204 is, for example, a CPU (Central Processing Unit) and controls the whole image forming device 12 based on a control program stored in built-in ROM.

The printer engine 205 executes printing based on the print data received from the print data spooling unit 203. As for print methods this printer engine 205 adopts, there are many methods, for example, a thermal transfer method (dye sublimation-type and thermal wax transfer-type), a thermal method, an inkjet method, an electrophotographic method and the print method is not particularly restricted.

Figure 2:
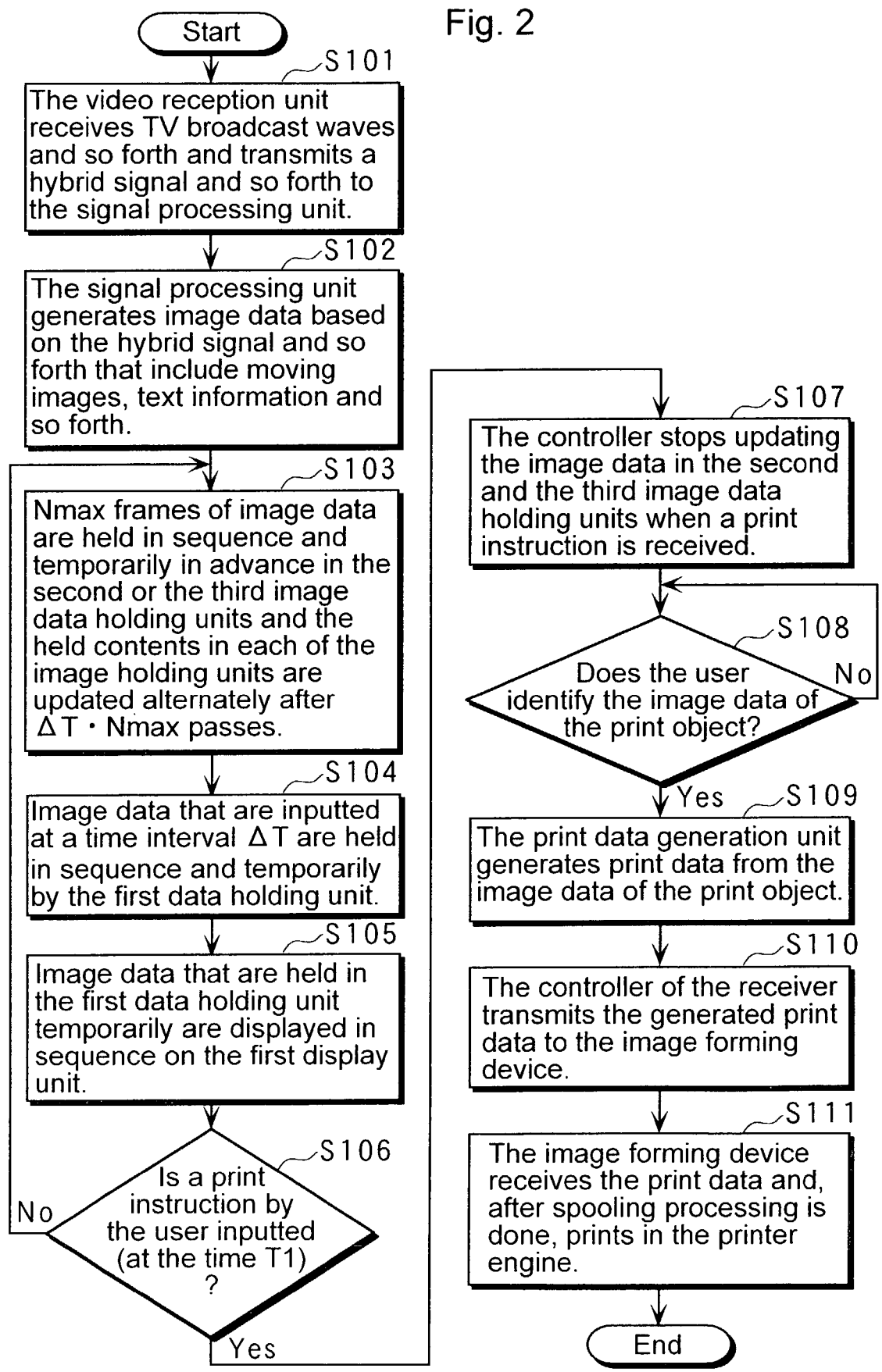
FIG. 2 is a flowchart that shows cooperative processing of the receiver and the image forming device according to the first embodiment.

Next, cooperative operations between the receiver 11 and the image forming device 12 in the video output device 10 will be explained referring to FIG. 1 and the flowchart of FIG. 2.

For a start, the video reception unit 101 of the receiver 11 receives TV broadcast waves and so forth, generates a hybrid signal that includes moving images, text information and so forth, and transmits the generated hybrid signal and so forth to the signal processing unit 102 through the bus 113 (Step S101).

The signal processing unit 102 receives the hybrid signal from the video reception unit 101, generates image data based on this hybrid signal and so forth, and outputs the image data to the bus 113 (Step S102). Then, the controller 109 holds the generated image data temporarily in the image data holding unit 103 (Step S103~Step S105).

Here, a concrete method in the case that the controller 109 holds the image data temporarily in the first image data holding unit 103A~the third image data holding unit 103C is explained.

In the first image data holding unit 103A, one frame of the image data (the latest frame image and so forth) to display a TV video and so forth in real time is memorized and updated in a frame cycle. Additionally, in the second image data holding unit 103B and the third image data holding unit 103C, the maximum Nmax frames of the image data each are held alternately each certain time. Consequently, by using the present image output device 10, as for a TV video, it is possible to print the video maximum 2 Nmax frames ago. Here, "Nmax" is the size of the image data that is memorized in the second image data holding unit 103B or the third image data holding unit 103C and expressed by the number of frames.

Figure 3:
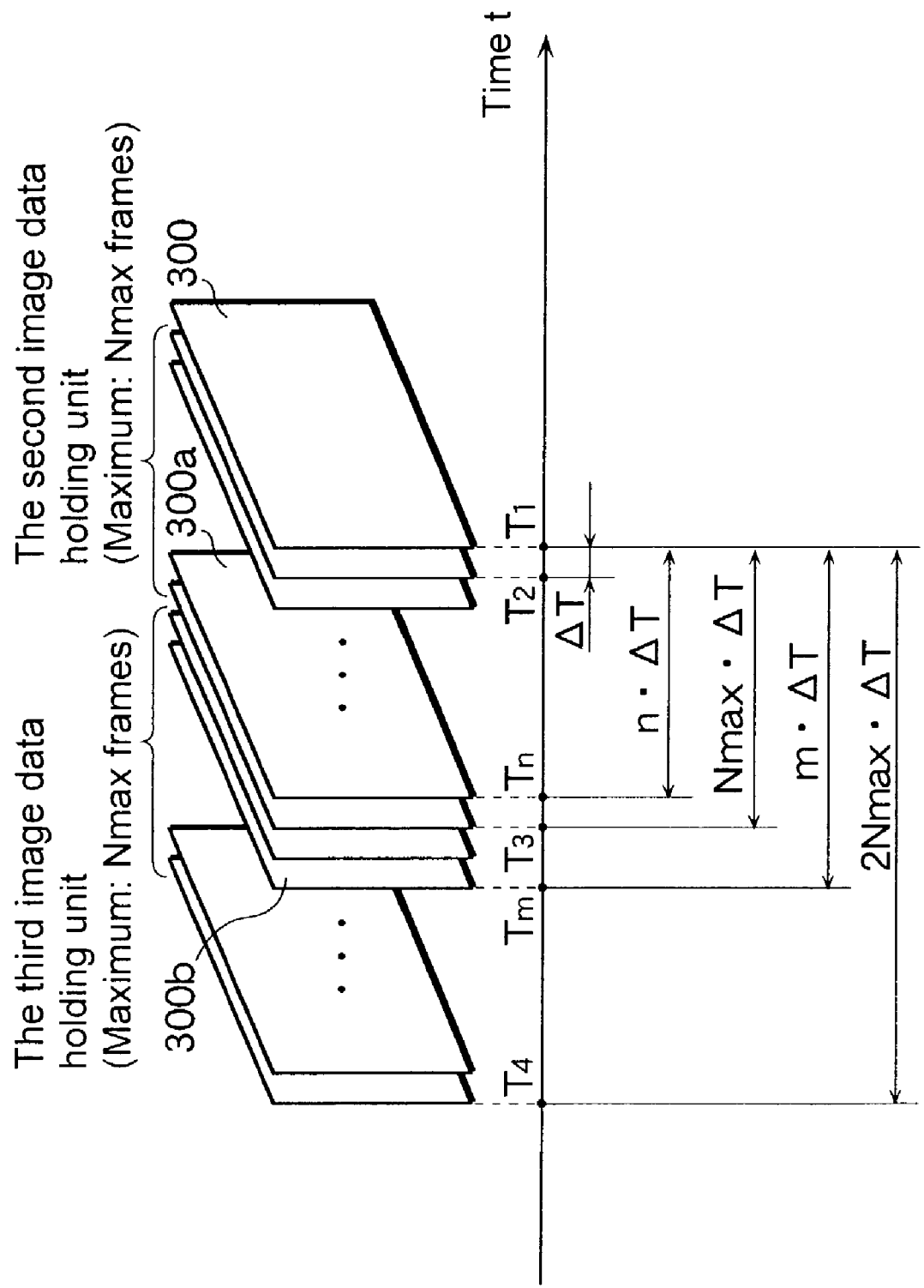
FIG. 3 is an example of a method for identifying an image that is displayed on the second display unit from image data that is held in the second image data holding unit and the third image data holding unit.

Operations of the second image data holding unit 103B and the third image data holding unit 103C are further explained in detail referring to FIG. 3. In an example of FIG. 3, for the sake of convenience, is shown the case that at the time T1 right after Nmax frames of the image data are held in the second image data holding unit 103B, a print instruction is inputted by a user through the remote control device 108 and so forth. Consequently, by the time T1, in the second image data holding unit 103B and the third image data holding unit 103C, Nmax frames each of the image data are held on a time series.

Moreover, in the first image data holding unit 103A, the image data of a TV video and so forth in real time are held and updated in a frame cycle (namely, every $\Delta T$). Furthermore, when the user instructs to print, the first image data holding unit 103A holds, by an instruction of the controller 109, the image data of the most recent image to the time when the print instruction was given (T1). Here, "$\Delta T$" represents a frame cycle ($1/30$ second in the case of NTSC system).

Moreover, hereafter, for the sake of convenience, the first and second display units 105 and 106 display in non-interlace mode.

On the other hand, the second image data holding unit 103B and the third image data holding unit 103C stop updating the image data after the time T1. At this juncture, in the third image data holding unit 103C, Nmax frames of image data after the time T4 (T1$-$2Nmax$\cdot\Delta T$) are held while in the second image data holding unit 103B, Nmax frames of image data after the time T3 (T1$-$Nmax$\cdot\Delta T$) are held.

After this, the place that holds the image data switches from the second image data holding unit 103B to the third image data holding unit 103C or from the third image data holding unit 103C to the second image data holding unit 103B every Nmax$\cdot\Delta T$, the image data is held and after Nmax$\cdot\Delta T$ passes, the image data are overwritten (updated) by new image data. For example, when Nmax is 15, the switch of the place that holds the image data is made every 0.5 second.

Consequently, by the print instruction, at the time T1, image data 300 are held in the first image data holding unit 103A. Additionally, the image data that is n multiple of $\Delta T$ before the time T1 is held in the second image data holding unit 103B while the image data that is m multiple of $\Delta T$ before the time T1 is held in the third image data holding unit 103C. Then, in the second image data holding unit 103B and the third image data holding unit 103C, the image data are overwritten alternately every predetermined time (in the case that Nmax is 15, every 0.5 second) as is described above.

As is described above, the controller 109, until the user inputs a print instruction, controls to hold Nmax frames of image data in sequence in the second image data holding unit 103B or the third image data holding unit 103C and to update the held contents in each of the image holding units by overwriting new image data after $\Delta T \cdot$Nmax passes (Step S103).

As is described above, in the first image data holding unit 103A, overwriting (updating) of the image data is repeated in a frame cycle (a time interval: $\Delta T$) in order to display a TV video and so forth in real time (Step S104, Step S105).

In the circumstances above, when a print instruction by the user through the remote control device 108 is inputted (Step S106), the controller 109 stops holding and updating the image data in the second and the third image data holding units 103B and 103C (Step S107).

After this, the controller 109 determines two frame images at a certain time (for example, after n$\cdot\Delta T$ and m$\cdot\Delta T$ pass from the time T1) among the image data held in the second and the third image data holding units 103B and 103C and controls to have these two images displayed on the second display unit 106. In this case, "n$\cdot\Delta T$" and "m$\cdot\Delta T$" represent, in the case that the user instructs to print at the time T1, the two times when the probability that the image that the user wants to print exists around the two times is expected to be high. The user can set and change the values of these n and m (n<m: both of them are positive integers) through the remote control device 108 and so forth.

Next, the user identifies the image to be printed (for example, one of the above-mentioned two images) (Step S108: Yes), the print data generation unit 110 generates print data from the image data of the identified image (Step S109). The controller 109 transmits the generated print data to the image forming device 12 (Step S110).

After this, the image forming device 12 receives the print data through the network 13, the interface processing unit 201 and the communication port 202 and, after spooling processing is done in the print data spooling unit 203, prints in the printer engine 205 based on the received print data (S111).

As is described above, among the image data held in the second and the third image data holding units 103B and 103C, the image that the user selects should be the image at the time T1$-$n$\cdot\Delta T$ and the image at the time T1$-$m$\cdot\Delta T$ and the user can set and change the values of n and m. Consequently, the user who uses the image output device according to the present embodiment can print the suitable video, in the case of printing a TV video and so forth, by adjusting the values of n and m appropriately, since the image that is the print object is identified considering the user's personal characteristics (response time and so forth).

Furthermore, it is acceptable to present a predetermined video to the user, have him/her try to instruct to print several times, to obtain the difference in the number of frames between the image at the time when the user instructs to print and the image selected by the user and to decide the most suitable values of n and m considering the difference. For example, there are the following methods.

(The first method) In the case of instructing to print two times, the values of n and m are determined by the first print instruction and advisability of the values of n and m is confirmed by the next print instruction.

(The second method) In the case of instructing to print several times (for example, three times), the values of n and m are determined based on a mean value of the above-mentioned difference.

Hereafter, the above-mentioned n and m are referred to as "print timing coefficients" and the function that decides n and m using the predetermined video is referred to as "learning function".

Here, in order to determine suitable print timing coefficients n and m, a particular test video is used. Additionally, in order to grasp more accurately the timing characteristic when the user instructs to print (namely, the difference in the number of frames between the proximate image at the time when the print instruction is made and the image that the user actually wants to print), the test video whose adjacent images change noticeably is preferable.

Furthermore, in order to grasp with precision the difference in the number of frames between the image that the user selects while watching the frame images that are held (namely, he wants to print) and the image that is decided by the above-mentioned n and m, the information to distinguish each frame image, for example, the successive numbers that represent the frame images (hereafter, referred to as "frame image number") are added to each frame image of the particular test video.

Figure 4:
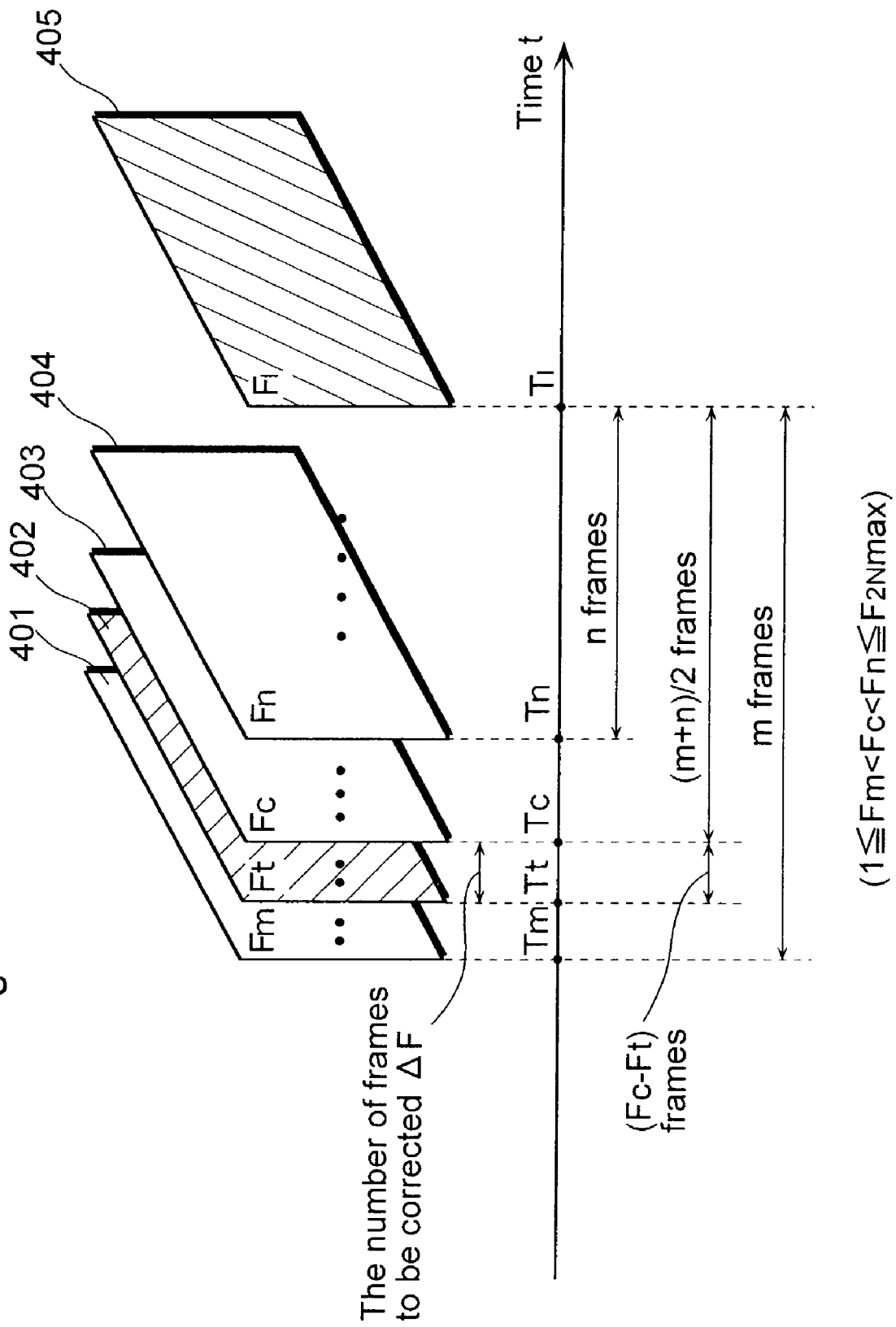
FIG. 4 is a diagram that shows interrelationship of each frame image in the case of deciding print timing coefficients n and m using a learning function of the first embodiment.
Figure 5:
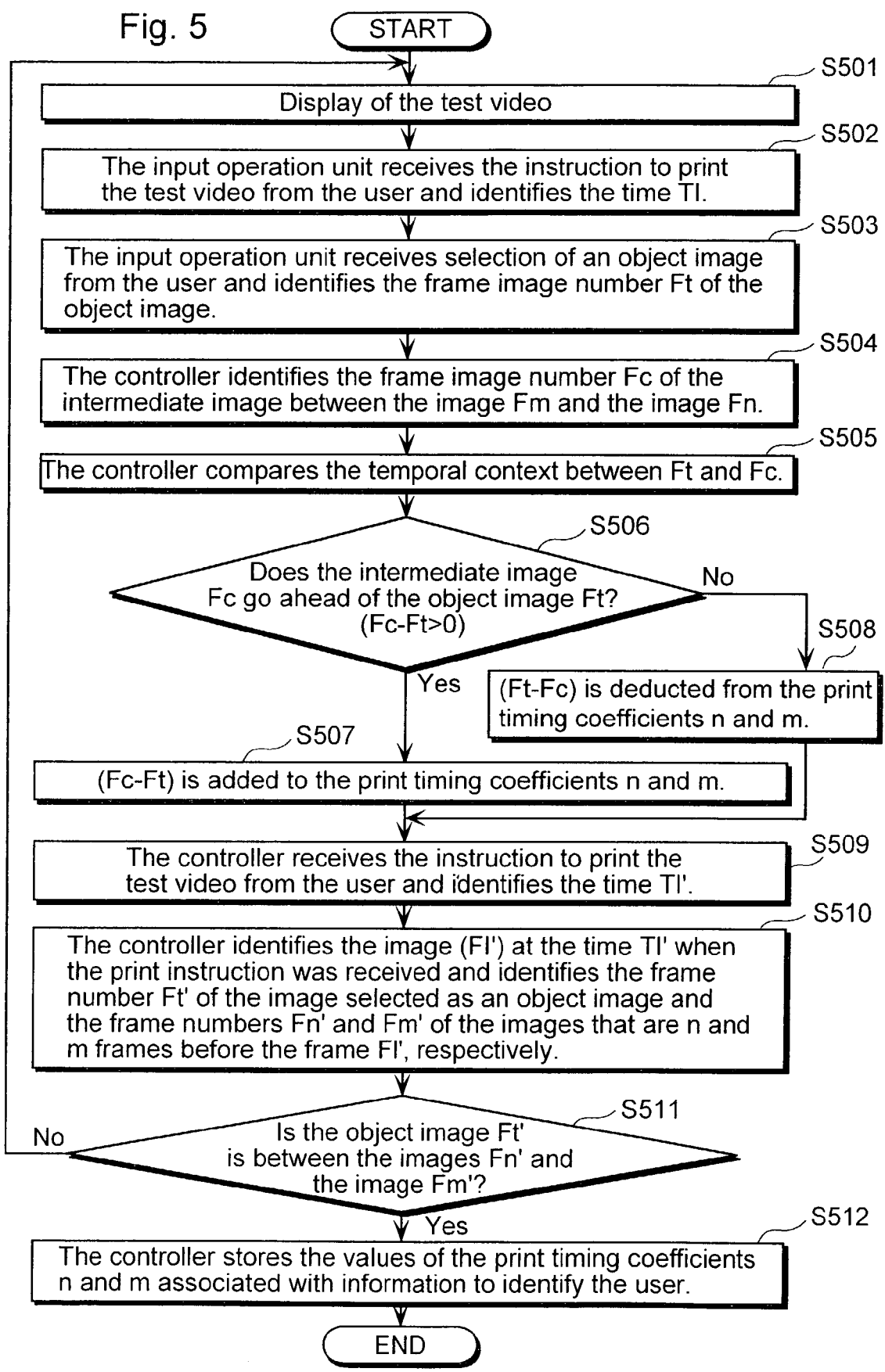
FIG. 5 is a flowchart that shows processing in the case of deciding the print timing coefficients n and m by a learning function of method 1.
Figure 6:
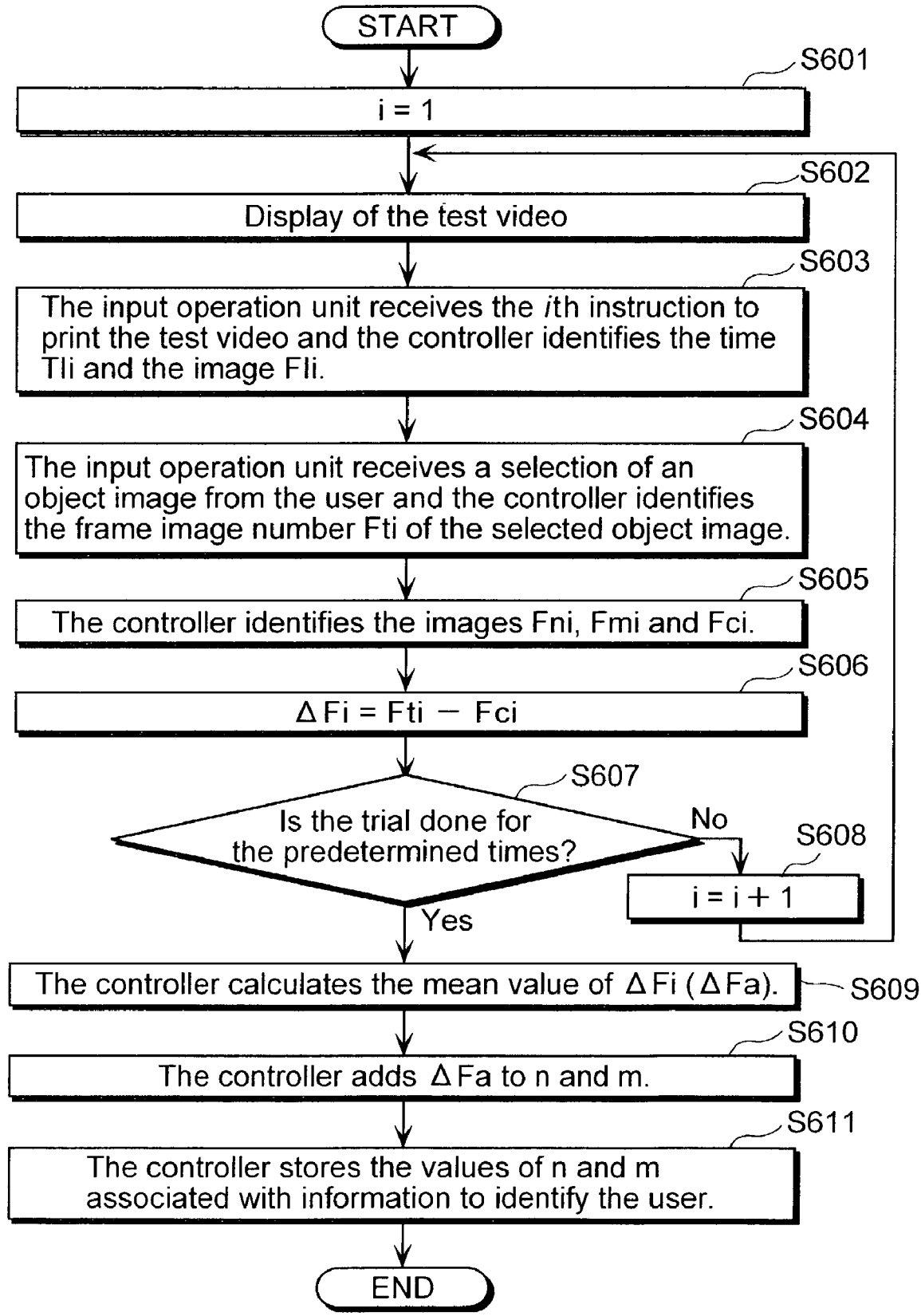
FIG. 6 is a flowchart that shows processing in the case of deciding the print timing coefficients n and m by a learning function of method 2.

Hereafter, a practical example in which the timing coefficients n and m for each user are determined by the learning function using the test video in which the frame image numbers are added to each frame image is explained concretely using FIG. 4~FIG. 6.

FIG. 4 is a diagram that shows interrelationship of each frame image in the case of deciding print timing coefficients n and m using the above-mentioned learning function. In FIG. 4, the time axis is defined in the direction from left to right, the style by which the frame images are held in sequence from left is shown.

As is shown in FIG. 4, the frame image number of the image 405 proximate to the time when the user instructs to print is defined as FI; the frame image number of the image 404 that is n frames before the image whose frame image number is FI (hereafter, referred to as "image FI") is defined as Fn; the frame image number of the image 401 that is m frames before the image FI is defined as Fm; the frame image number of the image 403 that is intermediate (hereafter, referred to as "intermediate image") between the image whose frame image number is Fn (hereafter, referred to as "image Fn") and the image whose frame image number is Fm (hereafter, referred to as "image Fm") is defined as Fc; and the image frame number of the object image 402 selected by the user is defined as Ft. In this case, the difference in the number of frames between the image whose frame image number is Ft (hereafter, referred to as "image Ft") and the image whose frame image number is Fc (hereafter, referred to as "image Fc") is the frame number AF that should be corrected to the print timing coefficients n and m.

Moreover, in FIG. 4, although the position of image Ft is situated between the image Fm and the image Fc, it is not always so. The image Ft may be situated left to the image Fm or may be situated right to the image Fn and so forth.

FIG. 5 is a flowchart that shows processing in the case of deciding the print timing coefficients n and m by a learning function of the method 1. In this case, the initial values for the print timing coefficients n and m are set in advance.

For a start, the controller 109 reads out the image data of the test video memorized in the first image data holding unit 103A and controls each unit in order to display the test video on the first display unit 105 (Step S501).

Next, the input operation unit 107 receives the first instruction to print the test video from the user through the remote control device 108 and so forth and identifies the time TI when this instruction is received (Step S502).

After this, the input operation unit 107 receives selection of an object image and identifies the frame image number Ft of the object image (Step S503). The controller 109 identifies the image Fn that is n frames before the image FI and the image Fm that is m frames before the image FI, and further identifies the intermediate image Fc (Step S504).

When the controller 109 receives the selection of the object image Ft from the user, the controller 109 controls in order that the test video is displayed by the unit of frame (for example, frame-by-frame) on the second display unit 106.

Then, the controller 109 compares the temporal context between the object image Ft and the intermediate image Fc as are identified above (Step S505), in the case that the intermediate image Fc goes ahead of the object image Ft (Step S506: Yes), the value of (Fc−Ft) is added to each of the print timing coefficients n and m in order that a correction is made. On the other hand, in the case that the intermediate image Fc does not go ahead of the object image Ft (Step S506: No), the value of (Ft−Fc) is deducted from each of the print timing coefficients n and m in order that the correction is made (Step S508).

When the first correction of the print timing coefficients n and m is completed, the controller 109, when it receives the second instruction to print the test video from the user, identifies the time TI' (Step S509). Further, the controller 109 identifies the image FI' proximate to the time TI' and identifies the second object image Ft' selected by the user and the image Fn' and the image Fm' based on the print timing coefficients n and m after the above-mentioned correction (Step S510). Furthermore, the controller 109 judges whether the object image Ft' is between the image Fn' and the image Fm' or not (Step S511). In the case that the object image Ft' is between the image Fn' and the image Fm' (Step S511: Yes), the controller 109 stores the corrected print timing coefficients n and m associated with information to identify the user (for example, User ID and so forth) in the first image data holding unit 103A (Step S512), and completes the present processing.

On the other hand, in the case that the object image Ft' is not between the image Fn' and the image Fm' (Step S511: No), the controller 109 controls to begin again from the processing of the first print instruction (Step S501~Step S511).

Moreover, in order to determine the suitable timing coefficients n and m for each individual, it is desirable to try the above-mentioned learning plural times (for example, 2~3 times).

FIG. 6 is a flowchart that shows processing in the case of deciding the print timing coefficients n and m by the learning function of method 2. In this case also, similarly to the method 1, the initial values for the print timing coefficients n and m are set in advance.

For a start, the controller 109 initializes a counter i (i=1) (Step S601) and, at the same time, reads out the image data of the test video memorized in the first image data holding unit 103A and controls each unit in order to display the test video on the first display unit 105 (Step S602).

Next, the input operation unit 107 receives an instruction to print the test video through the remote control device 108.

The controller 109 identifies the time TIi when the print instruction is received and the frame image number FIi of the image proximate to the time TIi (Step S603).

Further, the input operation unit 107 receives a selection of an object image from the user. The controller 109 identifies the frame image number Fti of the selected object image (Step S604) and, at the same time, identifies the image Fni that is n frames before the image FIi, the image Fmi that is m frames after the image FIi and the intermediate image Fci that is intermediate between the image Fni and the image Fmi (Step S605). Moreover, when the input operation unit 107 receives the selection of the object image, the controller 109 controls in order that the test video is displayed on the second display unit 106 by the unit of frame (for example, frame-by-frame advance).

In doing this, the controller 109 compares the temporal context between the object image Fti and the intermediate image Fci as are identified above, calculates the difference in the number of frames between the object image Fti and the intermediate image Fci, ΔFi (Fci−Fti) and memorizes ΔFi in a built-in memory (Step S606). Further, the controller 109 judges whether the above-mentioned processing is done for the predetermined times (for example, three times) or not (Step S607). In the case that the predetermined times are not met (Step S607: No), the controller 109 increases the value of the counter i by 1 (Step S608) and repeats the above-mentioned processing (Steps S602~S607).

On the other hand, in the case that the above-mentioned processing is done for the predetermined times (Step S607: Yes), the controller 109 calculates the mean value ΔFa of the difference ΔFi, corrects the values of the print timing coefficients n and m (Step S610), and stores the corrected n and m associated with information to identify the user (for example, User ID and so forth) in the first image data holding unit 103A (Step S611), and completes the present processing.

As is described above, using the image output device according to the present embodiment, even in the case of producing a hard copy of a video, it is possible to avoid an interruption in the video displayed on a monitor screen and have the user select suitably the image he wants.

Moreover, the receiver 11 is not limited to a receiver for TV broadcast waves, but includes a receiver that receives image data distributed on a network such as Internet and so forth and displays moving images based on the image data.

Additionally, even in the case of producing a hard copy of a video after recording a video in a record/replay device temporarily, replaying the image data, it goes without saying that it is easier to select the scene the user wants with reliability.

Additionally, in the present embodiment, an example in which the image data are held in the second and the third image data holding units 103B and 103C and the image data that are the print objects are selected is explained, but the number of image data holding units to hold image data that are print objects are not limited to this, but it is recommendable to decide an appropriate number comparing and thinking in view of the image data quantity that can be held, an increase in cost of a device by increasing memory area and so forth.

Additionally, by determining the values of the timing coefficients n and m for each user by the learning function and storing the values associated with the user identification information, it is possible to correct the deviation of timing for each user between the image that he wants to print and the image identified by actually instructing to print, and therefore it is possible to print the object image with reliability. Further, it is possible to fine-tune the print timing coefficients n and m to the most appropriate values for each user through the remote control device 108 and so forth.

The Second Embodiment

In the first embodiment, a practical example in which the receiver includes the second display unit, the second and the third image data holding units is indicated, but in the second embodiment, a practical example in which the image forming device includes the second display unit, the second and the third image data holding units is indicated.

Figure 7:
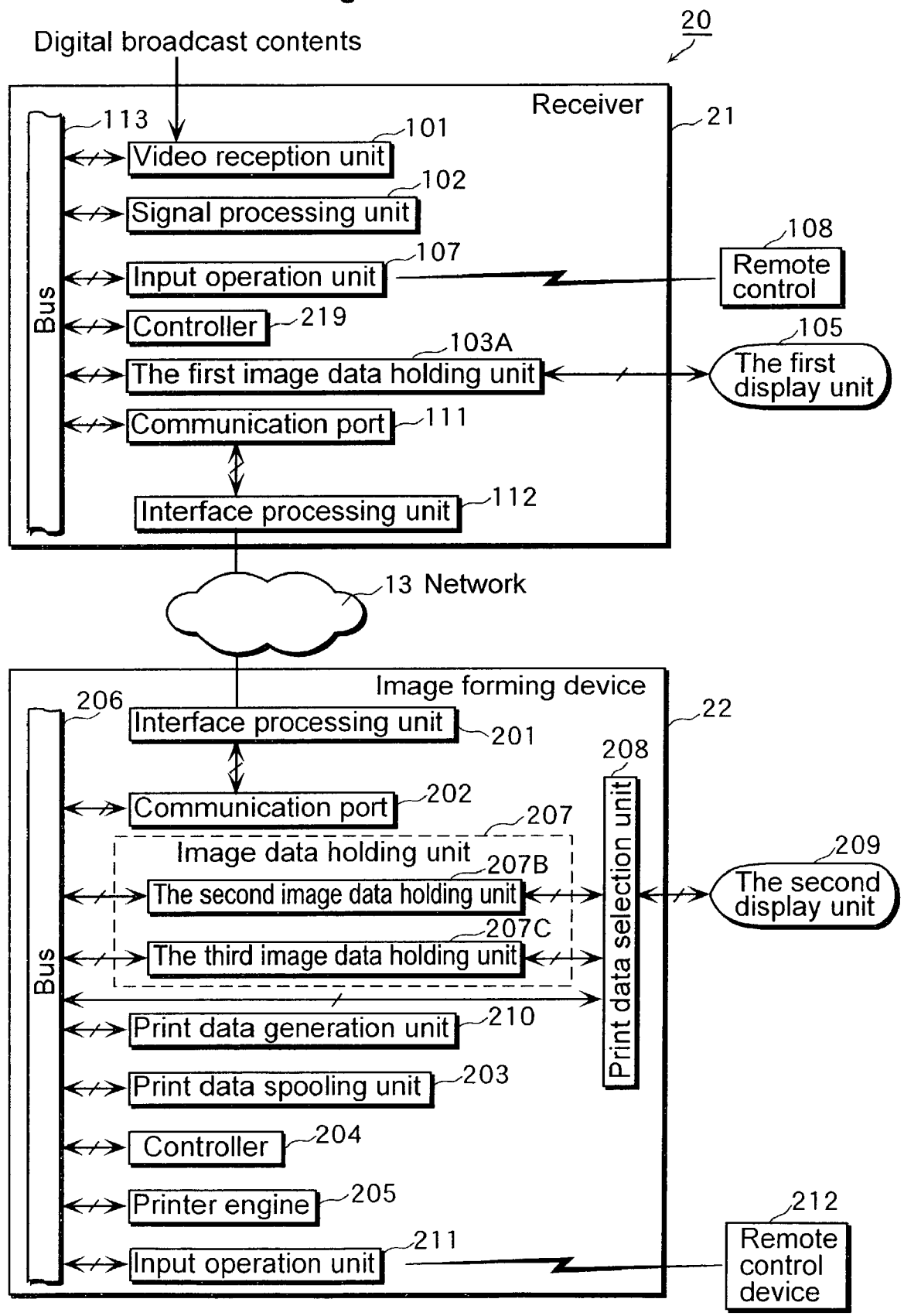
FIG. 7 is a block diagram that shows functional structures of a receiver and an image forming device according to the second embodiment.

FIG. 7 is a block diagram that shows functional structures of a receiver 21 and a image forming device 22 that constitute an image output device 20 according to the second embodiment.

The different points between the structure shown in FIG. 7 and the structure shown in FIG. 1 are that, as is stated above, the receiver 21 according to the second embodiment does not include the second image data holding unit 103B, the third image data holding unit 103C, the print data selection unit 104, the second display unit 106 and the print data generation unit 110 in the receiver 11 according to the first embodiment and that the image forming device 22 according to the second embodiment includes the second image data holding unit 207B, the third image data holding unit 207C, print data selection unit 208, the second display unit 209 and the print data generation unit 210.

The receiver 21, similarly to the receiver 11 according to the first embodiment, is a device that receives TV broadcast waves and so forth transmitted by the terrestrial broadcasting, BS (Broadcasting Satellite), CS (Communication Satellite) and so forth, and comprises the video reception unit 101, the signal processing unit 102, the input operation unit 107, the remote control device 108, a controller 219, the first image data holding unit 103A, the communication port 111 and the interface processing unit 112. Moreover, the components of the receiver 21 are connected to each other by a bus 113, a special-purpose cable and so forth.

The video reception unit 101 receives and decodes TV broadcast waves and so forth and extracts a video synchronous signal and transmits a hybrid signal similar to that of the first embodiment to the signal processing unit 102 through the bus 113.

The signal processing unit 102, based on the hybrid signal received from the video reception unit 101, generates image data of a video to be displayed on the first display unit 105 and transmits the image data to the first image data holding unit 103A through the bus 113.

The first image data holding unit 103A is a memory device that holds the image data temporarily such as a frame memory and so forth in order to have the video displayed in real time. Further, the first image data holding unit 103A, when the user instructs to print, holds the image data of the image proximate to the time (T1) when the user instructs to print by an instruction of the controller 219. Here, "ΔT" indicates a frame cycle (1/30 second in the case of NTSC system).

The controller 219 is, for example, a CPU (Central Processing Unit) and controls the whole receiver 21 based on a control program stored in built-in ROM. To be more specific, the controller 219 detects whether the image forming device 22 is connected to the receiver 21 or not. In the case that they are connected, the controller 219 transmits the image data held by the first image data holding unit 103A to the image forming device 22 through the bus 113, the communication port 111 and the interface processing unit 112. In this case, the controller 219 controls, based on a built-in calendar clock and the video synchronous signal extracted by the video reception unit 101, the timing by which the controller 219 holds the image data in the first image data holding unit 103A, and the timing by which the controller 219 transmits the image data to the image forming device 22. Additionally, the controller 219 controls the operations of the receiver 21 (for example, switch of channels, a display mode and so forth) following the instruction by the user received through the remote control device 108, the input operation unit 107 and the bus 113.

The communication port 111 is connected to the network 13 such as WAN, LAN and so forth through the interface processing unit 112, and exchanges data with external devices (for example, the image forming device 22 and a color printing device with a communication function) that are connected with the network 13.

The interface processing unit 112 converts the form of the image data received from the controller 219 into a form that can be transmitted on the network 13. For example, the image data are packetized conforming to the MPEG system.

The image forming device 22 is a device that receives the image data from the receiver 21, an external device, through the network 13 and so forth and prints a hard copy and so forth based on this image data, and comprises an interface processing unit 201, a communication port 202, a image data holding unit 207, a print data generation unit 210, a print data spooling unit 203, a controller 204, a printer engine 205, an input operation unit 211 and a remote control device 212. Moreover, the components that constitute the image forming device 22 are connected to each other by a bus 206, a special-purpose cable and so forth.

The communication port 202 is connected to the network 13 through the interface processing unit 201 and has a function to communicate with devices that are external of the image forming device 22.

The image data holding unit 207 is a memory device that holds the image data temporarily such as a frame memory and so forth in order to have the user select the image that he wants to print with reliability. To be more specific, the image data holding unit 207 captures the image data received through the interface processing unit 201 and the communication port 202 in a frame cycle and hold the image data in sequence temporarily.

Furthermore, the image data holding unit 207 comprises plural memorizing devices in order to hold plural image data. For example, to produce a hard copy of a video, it comprises the second image data holding unit 207B and the third image data holding unit 207C that hold the image data alternately for the predetermined time (for example, 0.5 second).

In this case, the timing by which the image data are held in the second image data holding unit 207B and the third image data holding unit 207C is determined by the controller 204. Moreover, the second image data holding unit 207B and the third image data holding unit 207C are connected to the print data selection unit 208.

The print data selection unit 208 receives the image data held temporarily in the second image data holding unit 207B and the third image data holding unit 207C. Further, the print data selection unit 208 outputs the image data of the image identified by an instruction of the controller 204 (for example, two images identified based on n and m) to the second display unit 209 and outputs the image data of the image selected by the user and received through the remote control device 212, the input operation unit 211 and so forth to the bus 206.

The controller 204 is, for example, a CPU (Central Processing Unit) and controls the whole image forming device 22 based on a control program stored in built-in ROM. To be more specific, when a print instruction of the user is received, the controller 204 stops updating the image data in the second image data holding unit 207B and the third image data holding unit 207C. Additionally, the controller 204 determines the frame image number of the image to be printed following an instruction of the user received through the remote control device 212, the input operation unit 211 and the bus 206.

The print data generation unit 210 captures the image data of the image selected at the print data selection unit 208 following the timing that the controller 204 determines through the bus 206 and generates print data from this image data.

The print data spooling unit 203, by an instruction of the controller 204, spools the print data and transmits the spooled print data to the printer engine 205. In other words, the print data spooling unit 203 controls to execute print processing without delay by using a high-speed auxiliary storage (not illustrated) as a buffer.

The printer engine 205 executes printing based on the print data received from the print data spooling unit 203. As for print methods this printer engine 205 adopts, there are many methods, for example, a thermal transfer method (dye sublimation-type and thermal wax transfer-type), a thermal method, an inkjet method, an electrophotographic method and the print method is not particularly restricted.

Figure 8:
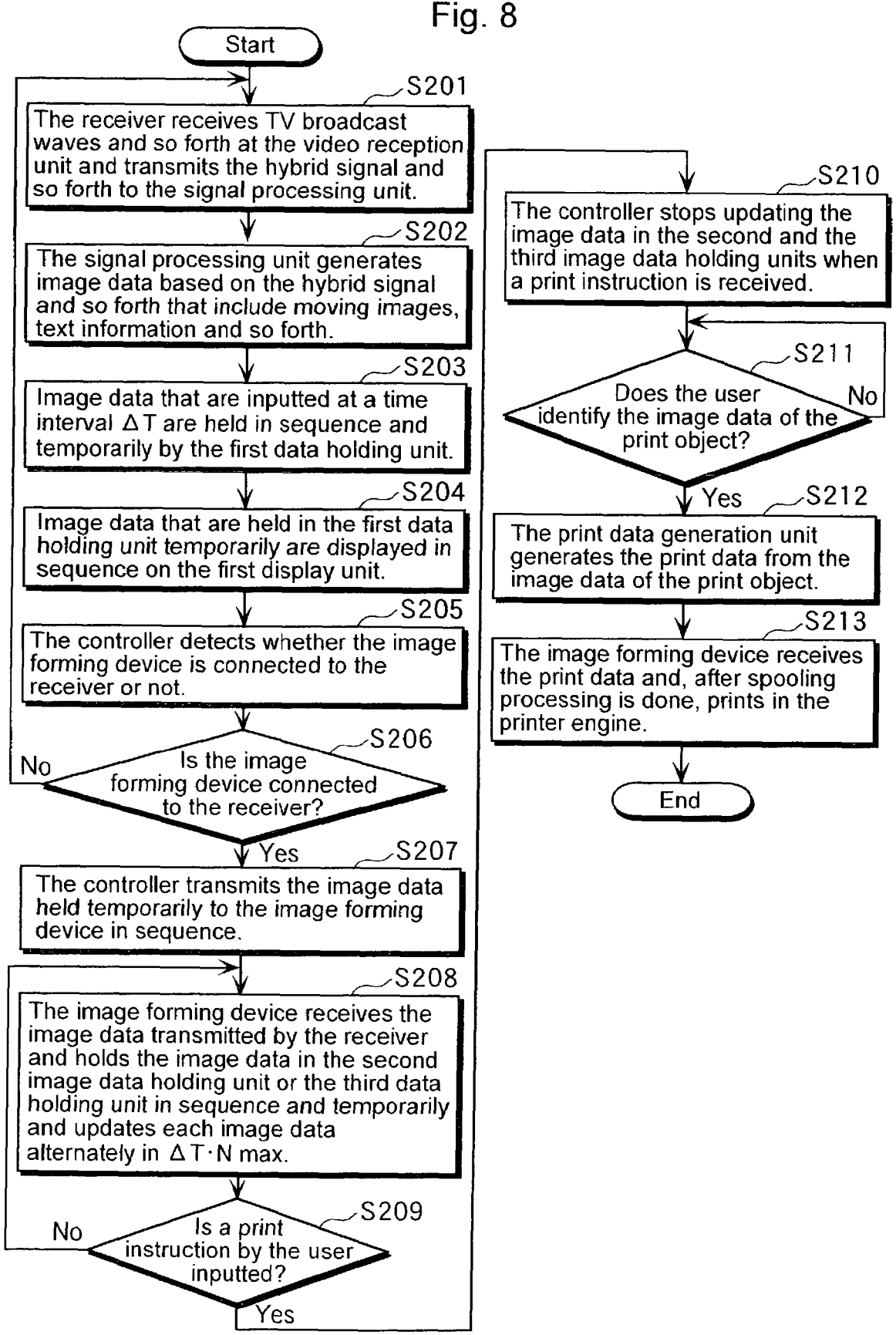
FIG. 8 is a flowchart that shows cooperative processing of the receiver and the image forming device according to the second embodiment.

Next, cooperative operations between the receiver 21 and the image forming device 22 in the video output device 20 will be explained referring to FIG. 7 and the flowchart of FIG. 8.

For a start, the receiver 21 receives TV broadcast waves and so forth at the video reception unit 101, generates a hybrid signal that includes moving images, text information and so forth, and transmits the generated hybrid signal and so forth to the signal processing unit 102 through the bus 113 (Step S201).

Next, the signal processing unit 102 receives the hybrid signal from the video reception unit 101 and generates image data (Step S202). The generated image data are stored in the first image data holding unit 103A temporarily through the bus 113 (Step S203).

The generated image data are transmitted to the first display unit 105 in real time in sequence and the first display unit 105 displays the video in real time (Step S204).

Next, the controller 219 makes sure whether the image forming device 22 is connected to the receiver 21 or not at a predetermined interval (for example, every second) (Step S205). In the case that the image forming device 22 is not connected to the receiver 21 (Step S206: No), the above-mentioned processing is repeated (Steps S201~S206).

On the other hand, in the case that the image forming device 22 is connected to the receiver 21 (Step S206: Yes), the controller 219 transmits the image data held in the first image data holding unit 103A to the image forming device 22 in sequence (Step S207).

The image forming device 22 receives the image data transmitted by the receiver 21 and holds the image data in the second image data holding unit 207B or the third data holding unit 207C alternately and in sequence (Step S208). Moreover, each image data is overwritten in $\Delta T \cdot N max$.

After this, when the user inputs a print instruction (Step S209), the controller 204 stops updating the image data in the second image data holding unit 207B and the third image data holding unit 207C at the time the print instruction has been received (Step S210).

Out of the image data held in the second image data holding unit 207B and the third image data holding unit 207C, the image data of the two predetermined frames (for example, T1−n·ΔT and T1−m·ΔT) are selected and displayed on the second display unit 209. At this juncture, the print data selection unit 208 switches the two images displayed on the second display unit 209 based on an instruction from the user inputted through the remote control device 108 and the input operation unit 211.

After this, the image to be printed is identified by the user (Step S211), the print data generation unit 210 generates print data from the image data of the identified print object (Step S212).

The controller 204 transmits the print data generated by the print data generation unit 210 to the print data spooling unit 203. The print data spooling unit 203 executes spooling processing of the received print data and transmits the print data to the printer engine 205 as is necessary. The printer engine 205 executes printing based on the print data received from the print data spooling unit 203 (Step S213).

As is described above, among the image data held by the second and third image data holding units 207B and 207C, let the images selected by the user be the image at the time T1−n·ΔT and the image at the time T1−m·ΔT. The user can set and change the values of n and m. Consequently, in the case of printing TV video and so forth, by adjusting the values of n and m as necessary, since the image of the print object is identified considering the user's characteristics (response time and so forth), the user using the image output device according to the present embodiment can print a suitable image.

Moreover, the receiver 21 is not limited to a receiver of TV broadcast waves, but includes the case of receiving image data distributed on the network such as Internet and so forth and displaying moving images based on the image data.

Moreover, in the present embodiment, an example in which two groups of the image data are held in the second and the third image data holding units and the image data that are the print objects are selected is explained, but the number of image data holding units to hold image data that are print objects are not limited to this, but it is recommendable to decide an appropriate number in view of the image data quantity that can be held, an increase in cost of a device by increasing memory area and so forth.

Additionally, it is possible that the structure of the image output device 20 includes, as the first embodiment, the learning function to determine the print timing coefficients n and m.

The Third Embodiment

Figure 9:
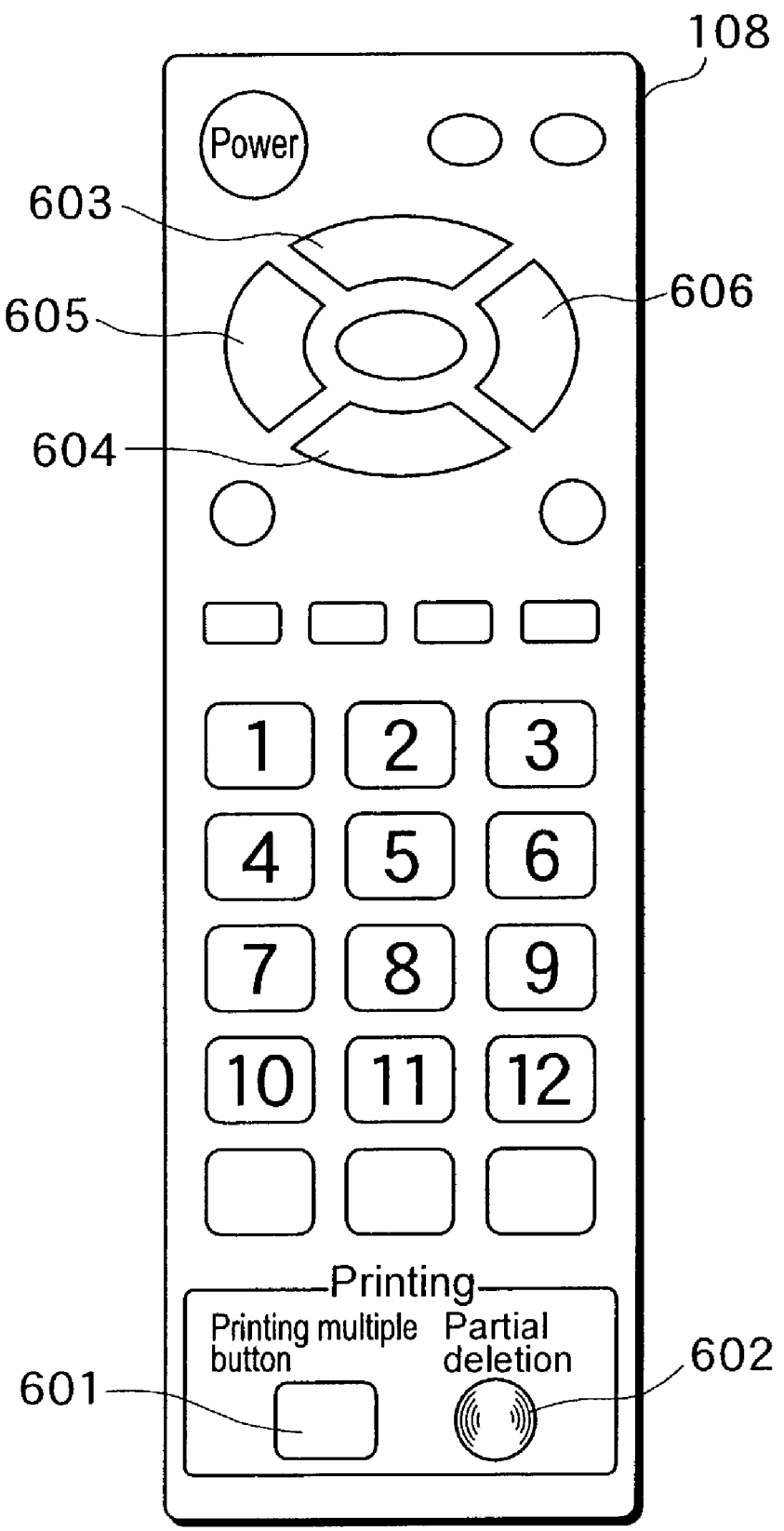
FIG. 9 is a diagram that shows an example of a remote control device according to the third embodiment.
Figure 10:
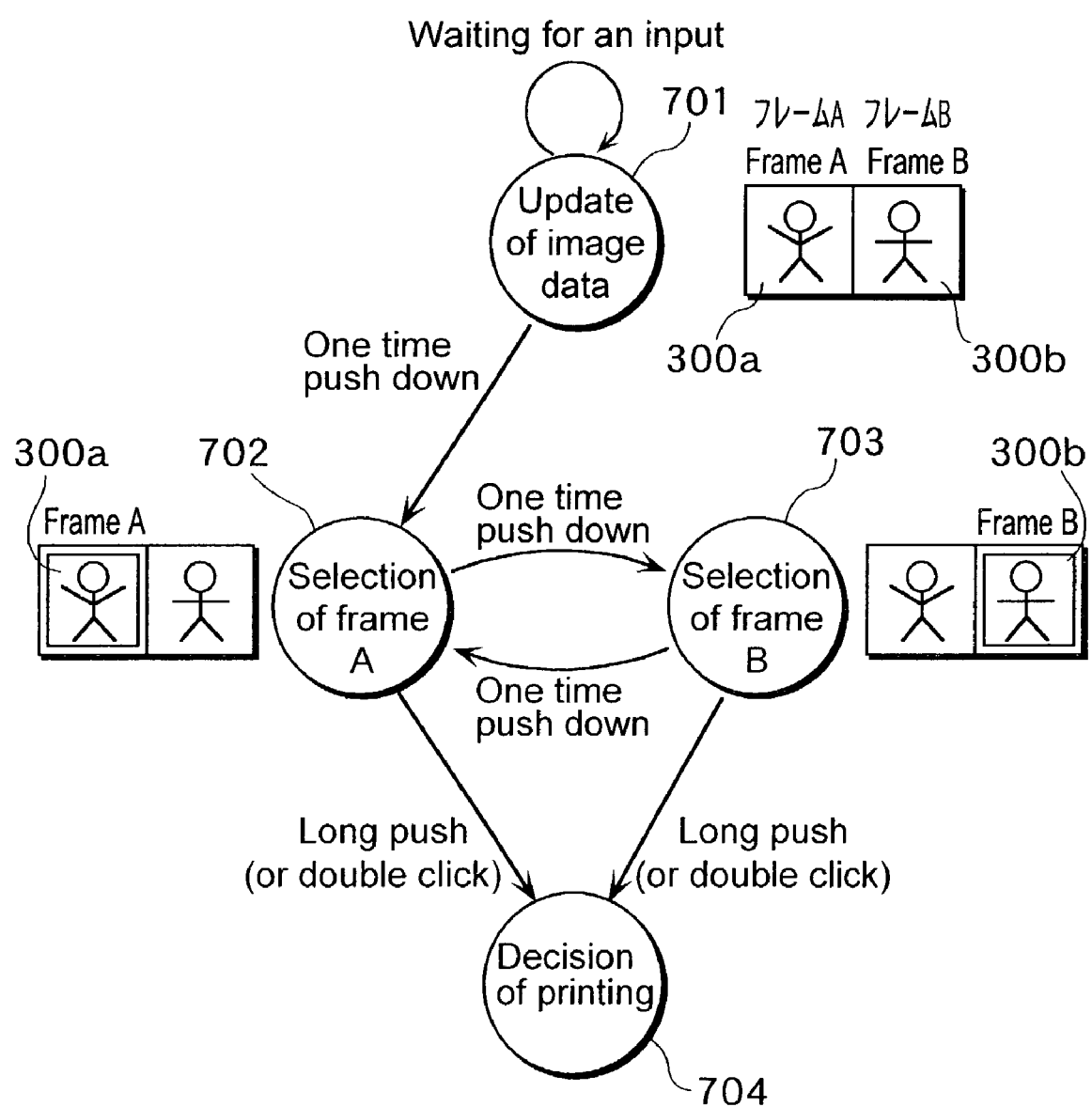
FIG. 10 is a diagram that shows relationship between button operations and images selected or decided.

In the third embodiment, operations of a remote control device to instruct printing according to the image output device 10 are explained referring to FIG. 9 and FIG. 10.

FIG. 9 is an external view of the remote control device 108 according to the present embodiment and FIG. 10 is a diagram that shows the relationship between two frame images identified by receiving an instruction to print from the user and operations of the remote control device 108.

For a start, until the user pushes down a printing multiple button 601, the image data are continuously updated in the second image data holding unit 103B and the third image data holding unit 103C. This state is a state waiting for an input from the user 701.

Next, when the user pushes down the printing multiple button 601 once (let this time be the time T1 in FIG. 3), the update of the second image holding unit 103B and the third image holding unit 103C stops and two frame images are identified from among the second image holding unit 103B and the third image holding unit 103C. In this case, the identified frame images are the images of the frames held by the timing at the predetermined time before the time T1, for example, n times and m times of ΔT before T1, respectively, the time Tn (Tn=T1−n·ΔT) and the time Δm (Tm=T1−m·ΔT).

Out of the two identified images, the image at the time Tn is displayed tentatively on the second display unit 106.

After this, every time the user pushes down the printing multiple button 601, the image at the time Tn and the image at the time Tm are displayed alternately. Further, in the case that the user makes "a long push (for example, more than 2 seconds)", the image at that time is determined as the image of the print object.

Up to this point, the case of selecting the 2 images identified based on the print timing coefficients n and m is explained, but it is possible to construct the image output device 10 to select many more frame images as the print objects.

Figure 11:
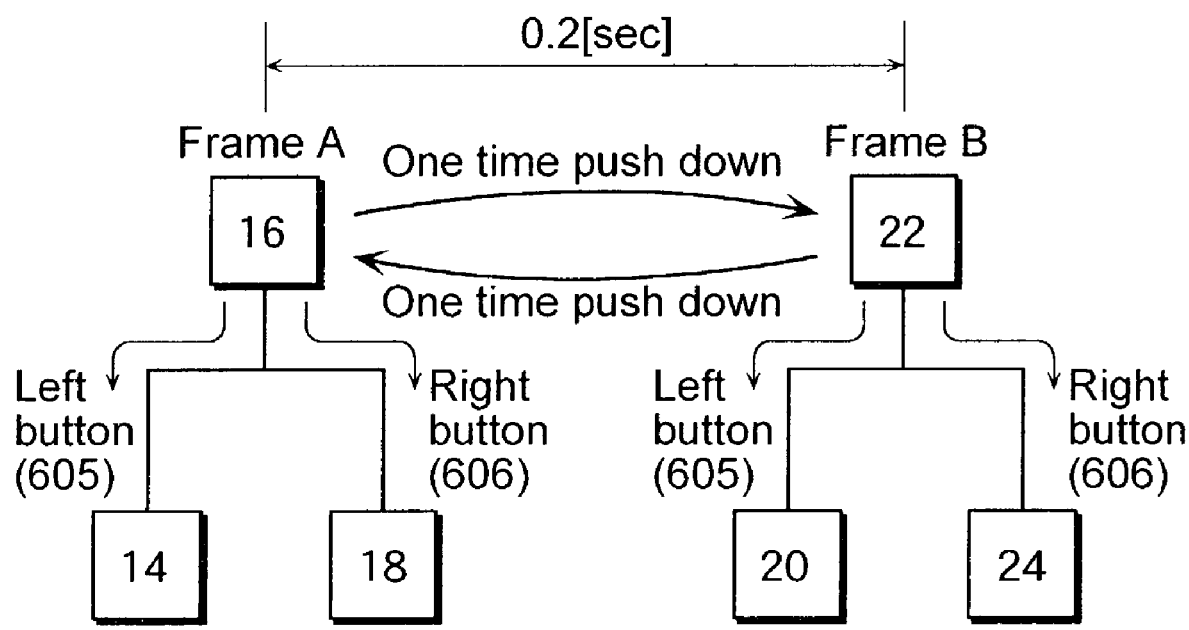
FIG. 11 is a pattern diagram that shows a hierarchical structure of an image that is a print object based on the identified 2 frame images.

FIG. 11 is a pattern diagram that shows a hierarchical structure of an image that is a print object based on the identified 2 frame images. Moreover, in FIG. 11, for the sake of convenience, similarly to the first embodiment, let the all images that can be held in the image data holding units 103B and 103C be 30 frames and suppose that each frame image number is "1" to "30".

As is indicated in FIG. 11, in the case that 2 images are identified based on the print timing coefficients n and m (for example, let these two frame numbers be "16" and "22"), the controller 109, automatically, identifies the image "14" and the image "18" for the image "16" (frame A) and identifies the image "20" and the image "24" for the image "22" (frame B).

In the case of selecting the image "14"~the image "24" as are identified above (when selection is made using the remote control device of FIG. 9), the image "16" and the image "22" switches every time the printing multiple button 601 is push down. Further, when the image "16" is displayed, the image "14" is selected in the case that the left button 605 is pushed down while the image "18" is selected in the case that the right button 606 is pushed down. Moreover, in the case of selecting the image "20"~the image "24", the similar operations are done.

The Fourth Embodiment

In the fourth embodiment, the case that the image data are edited and processed as appropriate after the print data are determined is explained.

It is acceptable to edit and process the image data of the print object after the print data are determined in the third embodiment. For example, it is acceptable to delete part of the image data that the user does not want to print by specifying the area of the image data to be deleted through the remote control device and to adjust the position of the image data after this unnecessary part is deleted.

Figure 12:
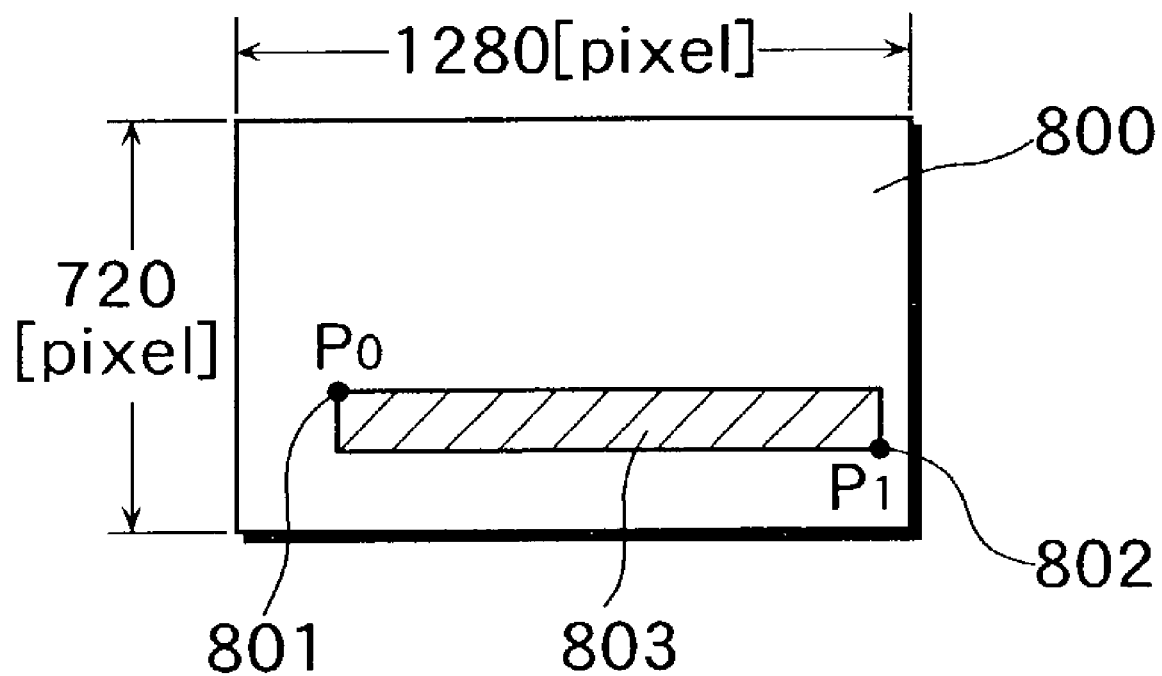
FIG. 12 is a diagram that shows a screen example in the case that a use specifies the part that he does not want to print according to the fourth embodiment.

FIG. 12 is a diagram that shows how the user specifies the part he does not want to print as is described above.

In doing this, in the case that the part that the user does not want to print is mixed with the image data of the print object, it is possible to delete the part he does not want to print and to print the part he really wants to print.

Moreover, in the first and second embodiments, a practical example in which the user identifies the image that he wants based on the two frames that are m frames or n frames apart from the latest first frame image is explained, but naturally it is acceptable to identify the image that he wants based on one frame that is n frames apart from the latest first frame image and further it is acceptable to identify the two frame images by supposing that the space between the two frame images is n frames.

Additionally, in the first embodiment, a practical example in which the print timing coefficients n and m change based on the test video is explained, but naturally it is acceptable to use an ordinary video. In this case, for example, it is acceptable to identify the frame image that is the standard in the video and to uniquely identify each frame image based on this standard frame image.

Further, in the first and second embodiments, a practical example in which the user selects the image that he wants to print by switching the image data displayed on the second display unit at the print data selection unit is explained, but it is acceptable that the user selects the image that he wants to print by displaying plural image data at the same time (a thumb nail display) on the second display unit.

Additionally, in the first embodiment, the receiver 11 and the image forming device 12 are connected through the network 13, but it is acceptable to connect them through the wireless LAN such as Bluetooth, IEEE802.11b and so forth and a special-purpose cable such as IEEE1394, USB and so forth.

Furthermore, in the first to the fourth embodiments, as the image output device to which the present invention is applied, the receiver that receives TV broadcast waves and so forth transmitted by a terrestrial broadcast wave, BS (Broadcasting Satellite), CS (Communication Satellite) and so forth is explained as an example, but the image output device is not limited to this and a portable terminal that can receive digital terrestrial broadcasting is acceptable.

What is claimed is:

1. An image output device for outputting an image from an inputted moving image signal, which includes frame images, to a printing device, said image outputting device comprising:
    a frame image holding unit operable to hold frame images from the inputted moving image signal including a first frame image, a second frame image that is n frames earlier in a frame sequence than the first frame image, and a third frame image that is m frames earlier in the frame sequence than the first frame image, and to periodically update the frame images held in the frame image holding unit from the inputted moving image signal;
    a change unit operable to change n and/or m through trial or learning according to a procedure based on a timing of an input from an operator;
    a display unit operable to display a frame image specified based on the changed n and/or the changed m, from among the frame images held by the frame image holding unit;
    a selection unit operable to select one frame image among the frame images held by the frame image holding unit according to an instruction by the operator concerning the frame image displayed on the display unit;
    an output unit operable to output the selected frame image to the printing device; and
    a video presentation unit operable to present predetermined video that includes plural frame images whose frame numbers are individually distinguishable,
    wherein the change unit acquires a trial print instruction from the operator to the video presentation unit and changes n and/or m based on a frame image identified by the trial print instruction.

2. The image output device according to claim 1,
    wherein the display unit includes a first display unit for displaying the first frame image held by the frame image holding unit, and a second display unit for displaying at least one frame image out of all frame images held by the frame image holding unit.

3. The image output device according to claim 1,
    wherein the change unit includes:
    a trial print reception unit operable to receive a trial print instruction from the operator;
    a trial selection reception unit operable to receive a selection of a frame image for trial printing;
    a correction unit operable to correct n and/or m based on the difference between the frame number of the frame image at the time when the trial print is instructed and the frame number of the frame image selected for the trial printing;
    a confirmation print reception unit operable to receive a print instruction for confirmation from the operator; and
    a judgment unit operable to judge advisability of the corrected n and/or corrected m based on the print instruction for confirmation.

4. The image output device according to claim 1,
    wherein the change unit includes:
    a trial print reception unit operable to receive plural trial print instructions from the operator;
    a trial selection reception unit operable to receive a selection of a frame image for a trial printing for each of the trial print instructions; and
    a correction unit operable to calculate the difference between the frame number of the frame image at the time the print instruction is given and the frame number of the image selected for the trial printing for each of the trial print instructions and to correct n and/or m based on the mean value of the difference.

5. An image output device for outputting an image from an inputted moving image signal, which includes frame images, to a printing device, said image outputting device comprising:
    a frame image holding unit operable to hold frame images from the inputted moving image signal including a first frame image, a second frame image that is n frames earlier in a frame sequence than the first frame image, and a third frame image that is m frames earlier in the frame sequence than the first frame image, and to periodically update the frame images held in the frame image holding unit from the inputted moving image signal;
    a change unit operable to change n and/or m through trial or learning according to a procedure based on a timing of an input from an operator;
    a display unit operable to display a frame image specified based on the changed n and/or the changed m, from among the frame images held by the frame image holding unit;
    a selection unit operable to select one frame image among the frame images held by the frame image holding unit according to an instruction by the operator concerning the frame image displayed on the display unit;

an output unit operable to output the selected frame image to the printing device;

a print instruction unit having a print instruction button to instruct printing a frame image; and a print control unit operable to:

when the print instruction button is pressed: stop the updating of frame images in the frame image holding unit; and display a frame image from the frame image holding unit on the display unit;

every time the print instruction button is subsequently pressed: change the frame image from the frame holding unit that is displayed on the display unit; and when a predetermined operation of the print instruction button is performed: output the frame image that is displayed on the display unit to the output unit.

6. The image output device according to claim 5, wherein the predetermined operation of the print instruction button is the print instruction button being pushed for more than a predetermined time.

7. The image output device according to claim 5, wherein the predetermined operation of the print instruction button is the print instruction button being pushed plural times during a predetermined time interval.

8. The image output device according to claim 5, wherein the display unit displays plural frame images held in the frame holding unit as thumbnail images after the updating of frame images in the frame holding unit is stopped by the print control unit.

9. The image output device according to claim 5, further comprising:

an image editing unit operable to edit at least one frame image held in the frame image holding unit according to an instruction from the operator after the updating of frame images in the frame holding unit is stopped by the print control unit;

wherein the output unit outputs the at least one frame image edited by the image editing unit to the printing device.

10. The image output device according to claim 9, wherein the image editing unit is operable to cut away an unnecessary part of the at least one frame image according to an instruction from the operator and to adjust the position of the at least one frame image after the unnecessary part is cut away.

11. An image forming device for receiving a moving image signal including frame images from an image output device, and for generating print data, wherein the image output device holds a first frame image, said image forming device comprising:

a frame image holding unit operable to receive and hold frame images from the image output device including a second frame image that is n frames earlier in a frame sequence than the first frame image, and a third frame image that is m frames earlier in the frame sequence than the first frame image;

a change unit operable to change n and/or m according to a procedure based on a timing of an input from an operator;

a display unit operable to display a frame image specified based on the changed n and/or the changed m, from among the frame images held by the frame image holding unit;

a selection unit operable to select one frame image among the frame images held by the frame image holding unit according to an instruction by the operator concerning the frame image displayed on the display unit;

a print data generation unit operable to generate print data to print the selected frame image;

a print instruction unit having a print instruction button to instruct printing a frame image; and a print control unit operable to:

when the print instruction button is pressed: send an instruction to the image output device to stop outputting frame images to the image forming device;

every time the print instruction button is subsequently pressed: change the frame image from the frame image holding unit that is to be displayed on the display unit; and cause the display unit to display the changed frame image; and when a predetermined operation of the print instruction button is performed: cause the print data generation unit to generate print data of the frame image that is displayed on the display unit to the output unit.

12. The image forming device according to claim 11, wherein the predetermined operation of the print instruction button is the print instruction button being pushed for more than a predetermined time, and the print control unit causes the print data generation unit to generate the print data of the frame image that is displayed on the display unit.

13. The image forming device according to claim 11, wherein the predetermined operation of the print instruction button is the print instruction button being pushed plural times during a predetermined time interval, and the print control unit causes the print data generation unit to generate the print data of the frame image that is displayed on the display unit.

14. The image forming device according to claim 11, wherein the display unit displays plural frame images held in the frame holding unit as thumbnail images after the print control unit sends the instruction to stop outputting frame images to the image output device.

15. The image forming device according to claim 11, further comprising:

an image editing unit operable to edit at least one frame image held in the frame image holding unit according to an instruction from the operator after the print control unit sends the instruction to stop outputting frame images to the image output device;

wherein the print data generation unit generates print data of the at least one frame image edited by the image editing unit.

16. The image forming device according to claim 15, wherein the image editing unit is operable to cut away an unnecessary part of the at least one frame image according to an instruction from the operator and to adjust the position of the at least one frame image after the unnecessary part is cut away.

17. A method for generating a hard copy of video by outputting an image from an inputted moving image signal, which includes frame images, to a printing device, said method comprising:

holding frame images from the inputted moving image signal including a first frame image, a second frame image that is n frames earlier in a frame sequence than the first frame image, and a third frame image that is m frames earlier in the frame sequence than the first frame image, and updating, periodically, the held frame images from the inputted moving image signal;

changing n and/or m through trial or learning according to a procedure based on a timing of an input from an operator;

displaying a frame image specified based on the changed n and/or the changed m, from among the held frame images;

selecting one frame image among the held frame images according to an instruction by the operator concerning the displayed frame image;

outputting the selected frame image to the printing device; and displaying a predetermined video that includes plural frame images whose frame numbers are individually distinguishable, wherein said changing further comprises acquiring a trial print instruction from the operator and changing n and/or m based on a frame image identified by the trial print instruction.

18. The image output device according to claim 17, wherein said changing further comprises:

receiving a selection of a frame image for trial printing;

correcting n and/or m based on the difference between the frame number of the frame image at the time when the trail print is instructed and the frame number of the frame image selected for the trial printing;

receiving a print instruction for confirmation from the operator; and judging advisability of the corrected n and/or corrected m based on the print instruction for confirmation.

19. The method according to claim 17, wherein said changing further comprises:

receiving plural trial print instructions from the operator;

receiving a selection of a frame image for a trial printing for each of the trial print instructions; and calculating the difference between the frame number of the frame image at the time the print instruction is given and the frame number of the image selected for the trial printing for each of the trial print instructions and correcting n and/or m based on the mean value of the difference.

20. A method for use with a print instruction unit having a print instruction button to instruct printing a frame image, for generating a hard copy of video by outputting an image from an inputted moving image signal, which includes frame images to a printing device, said method comprising:

holding frame images from the inputted moving image signal including a first frame image a second frame image that is n frames earlier in a frame sequence than the first frame image, and a third frame image that is m frames earlier in the frame sequence than the first frame image, and updating, periodically, the held frame images from the inputted moving image signal;

changing n and/or m through trial or learning according to a procedure based on a timing of an input from an operator;

displaying a frame image specified based on the changed n and/or the changed m, from among the held frame images;

selecting one frame image among the held frame images according to an instruction by the operator concerning the displayed frame image; and when the print instruction button is pressed: stopping the updating of frame images in the frame image holding unit; and displaying a held frame image;

every time the print instruction button is subsequently pressed: changing the held frame image that is displayed; and when a predetermined operation of the print instruction button is performed: outputting the frame image that is being displayed.

21. The method according to claim 20, wherein the predetermined operation of the print instruction button is the print instruction button being pushed for more than a predetermined time.

22. The method according to claim 20, wherein the predetermined operation of the print instruction button is the print instruction button being pushed plural times during a predetermined time interval.

23. The method according to claim 20, wherein said displaying of frame images includes displaying plural held frame images as thumbnail images after the updating of frame images is stopped.

24. The method according to claim 20, further comprising:

editing at least one held frame image according to an instruction from the operator after the updating of frame images is stopped; and outputting the at least one edited frame image.

25. The method according to claim 24, wherein said editing includes cutting away an unnecessary part of the at least one frame image according to an instruction from the operator and adjusting the position of the at least one frame image after the unnecessary part is cut away.

26. A video hard copy generation method for receiving a moving image signal including frame images from an image output device, and for generating print data, wherein the image output device holds a first frame image, said method comprising:

receiving and holding frame images from the image output device, including a second frame image that is n frames earlier in a frame sequence than the first frame image, and a third frame image that is m frames earlier in the frame sequence than the first frame image;

changing n and/or m according to a procedure based on a timing of an input from an operator;

displaying a frame image specified based on the changed n and/or the changed m, from among the held frame images;

selecting one frame image among the held frame images according to an instruction by the operator concerning the displayed frame image;

generating print data to print the selected frame image;

detecting operation of a print instruction button by the operator;

when the print instruction button is pressed: sending an instruction to the image output device to stop outputting frame images;

every time the print instruction button is subsequently pressed: changing the frame image that is to be displayed; and causing the changed frame image to be displayed; and when a predetermined operation of the print instruction button is performed: generating print data of the displayed frame image that is caused to be displayed.

27. A computer program embodied on a machine readable medium for use with an image output device that outputs an image from an inputted moving image signal, which includes frame images, to a printing device, said program causing a computer to execute a method comprising:

holding frame images from the inputted moving image signal including a first frame image, a second frame image that is n frames earlier in a frame sequence than the first frame image, and a third frame image that is m frames earlier in the frame sequence than the first frame image, and updating, periodically, the held frame images from the inputted moving image signal;

changing n and/or m through trial or learning according to a procedure based on a timing of an input from an operator;

displaying a frame image specified based on the changed n and/or the changed m, from among the held frame images;

selecting one frame image among the held frame images according to an instruction by the operator concerning the displayed frame image;

outputting the selected frame image to the printing device;

displaying a predetermined video that includes plural frame images whose frame numbers are individually distinguishable, wherein said changing further comprises acquiring a trial print instruction from the operator and changing n and/or m based on a frame image identified by the trial print instruction.

28. A computer program embodied on a machine readable medium for use with an image forming device for receiving a moving image signal including frame images from an image output device, and for generating print data, wherein the image output device holds a first frame image, said program causing a computer to execute a method comprising:

receiving and holding frame images from the image output device, including a second frame image that is n frames earlier in a frame sequence than the first frame image, and a third frame image that is m frames earlier in the frame sequence than the first frame image;

changing n and/or m according to a procedure based on a timing of an input from an operator;

displaying a frame image specified based on the changed n and/or the changed m, from among the held frame images;

selecting one frame image among the held frame images according to an instruction by the operator concerning the displayed frame image;

generating print data to print the selected frame image;

detecting operation of a print instruction button by the operator;

when the print instruction button is pressed: sending an instruction to the image output device to stop outputting frame images;

every time the print instruction button is subsequently pressed: changing the frame image that is to be displayed; and causing the changed frame image to be displayed; and when a predetermined operation of the print instruction button is performed: generating print data of the displayed frame image that is caused to be displayed.

* * * * *

UNITED STATES PATENT AND TRADEMARK OFFICE
CERTIFICATE OF CORRECTION

PATENT NO. : 7,221,470 B2 Page 1 of 1
APPLICATION NO. : 10/309069
DATED : May 22, 2007
INVENTOR(S) : Kouichi Takamine et al.

It is certified that error appears in the above-identified patent and that said Letters Patent is hereby corrected as shown below:

In the Claims

In column 19, claim 11, line 53, "output device including" should read --output device, including--.

In column 21, claim 18, line 21, "trail print" should read --trial print--.

In column 21, claim 20, line 44, "frame image a second" should read --frame image, a second--.

Signed and Sealed this

Twentieth Day of November, 2007

JON W. DUDAS
*Director of the United States Patent and Trademark Office*